(12) United States Patent
Wang et al.

(10) Patent No.: US 10,639,681 B2
(45) Date of Patent: May 5, 2020

(54) AUTOMATIC POWDER CLEANING SYSTEM FOR MIXED-LINE HUB BOLT HOLES AND COMBINED POWDER CLEANING GUN

(71) Applicant: CITIC Dicastal CO., LTD, Hebei (CN)

(72) Inventors: Zaide Wang, Hebei (CN); Huanming Ma, Hebei (CN); Hongtao Wang, Hebei (CN); Zhiliang Zhang, Hebei (CN); Qingwang Wei, Hebei (CN); Zhiwei Qin, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 15/673,931

(22) Filed: Aug. 10, 2017

(65) Prior Publication Data

US 2018/0369878 A1    Dec. 27, 2018

(30) Foreign Application Priority Data

Jun. 26, 2017  (CN) .......................... 2017 1 0495266

(51) Int. Cl.
*B08B 5/02* (2006.01)
*B08B 7/00* (2006.01)
(Continued)

(52) U.S. Cl.
CPC .............. *B08B 7/0028* (2013.01); *B08B 5/02* (2013.01); *B08B 5/04* (2013.01); *B08B 9/00* (2013.01); *B08B 15/04* (2013.01); *Y02P 70/36* (2015.11)

(58) Field of Classification Search
CPC ........... B08B 7/0028; B08B 5/02; B08B 5/04; B08B 9/00; B08B 15/04; B05B 14/10;
(Continued)

(56) References Cited

U.S. PATENT DOCUMENTS

2,995,393 A  *  8/1961  Charp ................... B61C 15/102
                                                        291/11.1
3,617,000 A  *  11/1971  Probst ..................... B05B 5/032
                                                        239/706
(Continued)

*Primary Examiner* — David G Cormier
*Assistant Examiner* — Thomas Bucci
(74) *Attorney, Agent, or Firm* — IPro, PLLC; Qian Gu (57) ABSTRACT

The invention discloses an automatic powder cleaning system for mixed-line hub bolt holes and a combined powder cleaning gun. The powder cleaning system comprises a control system, a recognition system, a powder cleaning robot, a gun storage and an accessory device. A plurality of combined powder spraying guns are arranged in the gun storage, and a quick disassembly fixture is arranged at the end of the powder cleaning robot. The powder cleaning system adopts robot programming and hub recognition technologies; according to the sizes of different hub bolt holes, ball sockets and platforms as well as product standards, the robot automatically and quickly selects different types of combined powder cleaning guns; after powder spraying under the condition that the hub is not provided with protectors, the head of the central gun barrel absorbs powder at the bolt hole, and the ball socket and platform gun barrel absorbs powder at the ball socket and platform of the bolt hole; protective small plugs for bolt holes are replaced by the powder cleaning gun, so that a large number of small plugs are avoided, the production cost is reduced, and the environmental pollution caused by paint drop of the small plugs is prevented; and the absorbed powder can be reused, so that the automatic powder cleaning system and the combined powder cleaning gun conform to the green, lean and automatic development process of modern enterprises.

4 Claims, 6 Drawing Sheets

(51) Int. Cl.
   *B08B 5/04*      (2006.01)
   *B08B 15/04*     (2006.01)
   *B08B 9/00*      (2006.01)

(58) Field of Classification Search
   CPC ....... B05B 5/032; B05B 5/1683; B05B 14/48;
            B05B 7/1404; B05D 1/04; B05D 1/06;
            B05D 2401/32; B05D 1/12
   USPC ...... 134/166 R, 34, 21, 172, 198, 22.12, 26;
            118/326, 309, 308, 324, 50; 239/690,
            239/698, 104, 124, 261, 262
   See application file for complete search history.

(56) References Cited

U.S. PATENT DOCUMENTS

| | | | | |
|---|---|---|---|---|
| 3,667,675 A * | 6/1972 | Sherman | | B05B 5/032 239/698 |
| 3,688,990 A * | 9/1972 | Liedberg | | B05B 5/032 239/524 |
| 3,709,434 A * | 1/1973 | Gebhardt | | B05B 5/032 239/8 |
| 3,740,612 A * | 6/1973 | Gauthier | | B05B 5/032 361/227 |
| 3,795,348 A * | 3/1974 | Vertue | | B05B 7/1404 406/153 |
| 3,819,115 A * | 6/1974 | Soderman | | B05B 5/032 239/698 |
| 3,844,477 A * | 10/1974 | Pollard | | B05B 5/032 239/706 |
| 3,870,232 A * | 3/1975 | Lacchia | | B05B 5/032 239/696 |
| 3,873,024 A * | 3/1975 | Probst | | B05B 5/032 239/704 |
| 3,940,061 A * | 2/1976 | Gimple | | B05B 5/032 239/705 |
| 3,964,683 A * | 6/1976 | Gimple | | B05B 5/032 239/691 |
| 3,977,607 A * | 8/1976 | Kobayashi | | B05B 5/032 239/145 |
| 4,039,145 A * | 8/1977 | Felici | | B05B 5/032 239/706 |
| 4,169,560 A * | 10/1979 | Vohringer | | B05B 5/1691 239/600 |
| 4,235,381 A * | 11/1980 | Vila | | B05B 5/032 239/696 |
| 4,324,361 A * | 4/1982 | Moos | | B05B 5/032 239/3 |
| 4,380,320 A * | 4/1983 | Hollstein | | B05B 5/032 239/290 |
| 4,401,275 A * | 8/1983 | Ruud | | B05B 5/032 239/704 |
| 4,598,870 A * | 7/1986 | Schloz | | B05B 1/14 239/295 |
| 4,630,777 A * | 12/1986 | Hollstein | | B05B 5/032 239/520 |
| 4,634,058 A * | 1/1987 | Hollstein | | B05B 5/032 239/697 |
| 4,638,951 A * | 1/1987 | Gabriel | | B05B 1/044 239/451 |
| 4,659,011 A * | 4/1987 | Moos | | B05B 5/032 239/3 |
| 4,706,890 A * | 11/1987 | Talacko | | B05B 5/032 239/426 |
| 4,735,360 A * | 4/1988 | Kirchner | | B05B 1/265 239/296 |
| 4,765,544 A * | 8/1988 | Kuhn | | B05B 5/032 239/698 |
| 4,815,666 A * | 3/1989 | Gacka | | B05B 5/032 239/456 |
| 4,993,645 A * | 2/1991 | Buschor | | B05B 5/032 239/708 |
| 5,052,756 A * | 10/1991 | Wada | | B05B 3/02 299/17 |
| 5,341,989 A * | 8/1994 | Fulkerson | | B05B 5/032 239/3 |
| 5,402,940 A * | 4/1995 | Haller | | B05B 5/047 239/697 |
| 5,482,214 A * | 1/1996 | Talacko | | B05B 5/0531 239/698 |
| 5,520,735 A * | 5/1996 | Mulder | | B05B 5/032 118/308 |
| 5,620,138 A * | 4/1997 | Crum | | B05B 5/032 239/132.5 |
| 5,636,798 A * | 6/1997 | Buschor | | B05B 5/032 239/696 |
| 5,711,489 A * | 1/1998 | Yanagida | | B05B 5/032 239/697 |
| 5,904,294 A * | 5/1999 | Knobbe | | B05B 5/032 239/105 |
| 5,957,396 A * | 9/1999 | Crum | | B05B 15/62 239/706 |
| 6,194,027 B1 * | 2/2001 | Mauchle | | B05B 5/032 427/180 |
| 6,276,618 B1 * | 8/2001 | Yanagida | | B05B 5/032 239/693 |
| 6,478,242 B1 * | 11/2002 | Knobbe | | B05B 1/04 239/690 |
| 2002/0072320 A1 * | 6/2002 | Shutic | | B05B 7/1404 454/50 |
| 2002/0078883 A1 * | 6/2002 | Shutic | | B01D 45/14 118/50 |
| 2002/0088397 A1 * | 7/2002 | Perkins | | B05B 5/00 118/695 |
| 2003/0019425 A1 * | 1/2003 | Shutic | | B05B 7/1404 118/309 |
| 2003/0038192 A1 * | 2/2003 | Shutic | | B05B 7/1454 239/690.1 |
| 2003/0080220 A1 * | 5/2003 | Mather | | B05B 1/04 239/690 |
| 2004/0061007 A1 * | 4/2004 | Milojevic | | B05B 5/032 239/690 |
| 2004/0065752 A1 * | 4/2004 | Mather | | B05B 13/0405 239/261 |
| 2004/0159724 A1 * | 8/2004 | van der Steur | | B05B 1/1627 239/690 |
| 2004/0245673 A1 * | 12/2004 | Allsop | | B05B 5/032 264/259 |
| 2005/0022483 A1 * | 2/2005 | Shutic | | B05B 7/1454 55/337 |
| 2005/0023374 A1 * | 2/2005 | Knobbe | | B05B 1/04 239/280 |
| 2005/0098659 A1 * | 5/2005 | Milojevic | | B05B 1/3421 239/525 |
| 2005/0103883 A1 * | 5/2005 | Schroeder | | B05B 15/50 239/104 |
| 2005/0115496 A1 * | 6/2005 | Shutic | | B05B 7/1445 118/308 |
| 2005/0126476 A1 * | 6/2005 | Shutic | | B05B 5/032 118/308 |
| 2005/0178851 A1 * | 8/2005 | Shutic | | B05B 7/1454 239/124 |
| 2006/0124780 A1 * | 6/2006 | Cooper | | B05B 5/03 239/690 |
| 2006/0144963 A1 * | 7/2006 | Fulkerson | | B05B 5/032 239/433 |
| 2007/0039547 A1 * | 2/2007 | Lacchia | | B05B 1/046 118/629 |
| 2007/0063077 A1 * | 3/2007 | Keudell | | B05B 5/032 239/690 |
| 2007/0266939 A1 * | 11/2007 | Kumata | | B05B 16/20 118/621 |
| 2008/0191067 A1 * | 8/2008 | Mauchle | | B05B 5/032 239/690 |
| 2009/0107397 A1 * | 4/2009 | Mather | | B05B 5/032 118/302 |
| 2009/0110803 A1 * | 4/2009 | Mather | | B05B 15/55 427/8 |

(56) References Cited

U.S. PATENT DOCUMENTS

| | | | |
|---|---|---|---|
| 2012/0058264 A1* | 3/2012 | Filou | B05B 1/265 427/181 |
| 2013/0052362 A1* | 2/2013 | Tamura | B05B 5/032 427/458 |
| 2015/0053797 A1* | 2/2015 | Fulkerson | B05B 7/1463 239/704 |
| 2015/0115073 A1* | 4/2015 | Mather | B05B 5/032 239/690 |
| 2015/0190823 A1* | 7/2015 | Mather | B05B 5/1683 239/707 |
| 2016/0051996 A1* | 2/2016 | Sanwald | B05B 5/032 239/398 |

\* cited by examiner

AUTOMATIC POWDER CLEANING SYSTEM FOR MIXED-LINE HUB BOLT HOLES AND COMBINED POWDER CLEANING GUN

RELATED APPLICATION

This application claims priority to Chinese Patent Application No. 201710495266.1, filed on Jun. 26, 2017, which is hereby incorporated by reference in its entirety.

FIELD OF THE INVENTION

The present invention relates to an automatic powder cleaning system for mixed-line hub bolt holes and a combined powder cleaning gun, and relates to the technical field of hub coating.

BACKGROUND OF THE INVENTION

An automobile wheel bolt hole, a ball socket and a platform pertain to the mating feature of a fastening bolt and a hub, and involve the safety, so paint films are not allowed. In the present hub coating production, small plug or ball protectors are generally adopted, and the sizes of the protectors corresponding to different wheels are different, so a large number of different protectors are needed; and paint drop treatment must be performed after the protectors are used for a period of time, and many hazardous wastes may be produced, resulting in noncompliance with the requirements of enterprises for green, lean and automatic development.

SUMMARY OF THE INVENTION

Aiming at the above defects of the prior art, the present invention provides an automatic powder cleaning system for mixed-line hub bolt holes and a combined powder cleaning gun, which are used for replacing small plug protection with automatic powder absorption in the hub powder spraying production process, thereby avoiding customization and storage of a large number of protective small plugs as well as massive pollution caused by paint drop treatment.

The present invention adopts the following technical solution: an automatic powder cleaning system for mixed-line hub bolt holes, characterized in that the powder cleaning system includes a control system, a recognition system, a powder cleaning robot, a gun storage and accessory device, wherein the recognition system and the powder cleaning robot are connected with the control system, a plurality of combined powder spraying guns are arranged in the gun storage, a quick disassembly fixture is arranged at the end of the powder cleaning robot, and the process flow of the powder cleaning system includes: storing a powder cleaning program, recognizing a wheel type, entering a powder room and spraying powder, entering a powder cleaning station, calling the powder cleaning program, replacing a gun by the robot, cleaning powder, and completing powder cleaning.

Further, the recognition system is a visual recognition system, and is used for recognizing and inputting all wheel type image information before production and editing wheel type code information, wherein the wheel type code information corresponds one-to-one to images.

Further, the recognition system refers to a bar code or two-dimensional code set at a specific position of a hub and a code reading device arranged at a wheel type recognition station, wherein the code reading device is connected with the control system.

A combined powder cleaning gun for the automatic powder cleaning system for mixed-line hub bolt holes includes a combined gun body and a gun barrel, characterized in that the combined gun body includes front and rear combined units, the lateral surface of each combined unit includes a front splicing section and a rear powder absorbing section, the diameter of the powder absorbing section is greater than that of the splicing section, a powder absorbing through hole is formed in the center of each combined unit, and the powder absorbing section of each combined unit is provided with a powder absorbing hole; the diameters of the splicing section and the powder absorbing section of the rear combined unit are respectively greater than those of the splicing section and the powder absorbing section of the front combined unit, and a connecting device is arranged at each of the front and rear ends of each combined unit; the gun barrel includes a central gun barrel and a ball socket and platform gun barrel, the tail of the central gun barrel is connected with the splicing section of the front combined unit, the tail of the ball socket and platform gun barrel is connected with the splicing section of the rear combined unit, the head of the central gun barrel protrudes out of the head of the ball socket and platform gun barrel, dense micro holes are formed in the side wall of the head of the central gun barrel, and two small plugs are provided to plug the powder absorbing hole of the rear combined unit.

Further, the connecting devices of each combined unit refer to an internal threaded hole formed in the front end of the powder absorbing through hole of each combined unit and an external threaded section formed at the tail end of each combined unit, the internal threaded hole and the external threaded section of each combined unit adopt mutually matched sizes, and the sizes of the internal threaded hole and the external threaded section of the each combined unit are completely same.

Further, the powder absorbing hole of the powder absorbing section is perpendicular to the axis of the combined unit, and is intersected with the powder absorbing through hole.

Further, a sealing section is formed adjacent to the internal threaded hole of the combined unit, and a sealing ring is installed between the rear end face of the external threaded section of the front combined unit and the sealing section of the rear combined unit.

The automatic powder cleaning system for mixed-line hub bolt holes and the combined powder cleaning gun are used for an automatic mixed-line powder spraying process of a hub via robot programming and hub recognition technologies. According to the sizes of different hub bolt holes, ball sockets and platforms as well as product standards, the robot automatically and quickly selects different types of combined powder cleaning guns; after powder spraying under the condition that the hub is not provided with protectors, the head of the central gun barrel absorbs powder at the bolt hole, and the ball socket and platform gun barrel absorbs powder at the ball socket and platform of the bolt hole; protective small plugs for bolt holes are replaced by the powder cleaning gun, so that a large number of small plugs are avoided, the production cost is reduced, and the environmental pollution caused by paint drop of the small plugs is prevented; and the absorbed powder can be reused, so that the automatic powder cleaning system and the combined powder cleaning gun conform to the green, lean and automatic development process of modern enterprises.

BRIEF DESCRIPTION OF THE DRAWINGS

In which: 1 ball socket and platform gun barrel, 2 central gun barrel, 3 front combined unit, 4 sealing ring, 5 rear combined unit, 6 small plug; 201 dense micro hole; 301 internal threaded hole A, 302 splicing section A, 303 sealing section A, 304 powder absorbing hole A, 305 powder absorbing section A, 306 external threaded section A, 307 powder absorbing through hole A; 501 internal threaded hole B, 502 splicing section B, 503 sealing section B, 504 powder absorbing hole B, 505 powder absorbing section B, 506 external threaded section B, 507 powder absorbing through hole B.

DETAILED DESCRIPTION OF THE EMBODIMENTS

The present invention will be further described in detail below in combination with embodiments and the accompanying drawings.

An automatic powder cleaning system for mixed-line hub bolt holes includes a control system, a recognition system, a powder cleaning robot, a gun storage and accessory device, wherein the recognition system and the powder cleaning robot are connected with the control system, a plurality of combined powder spraying guns are arranged in the gun storage, a quick disassembly fixture is arranged at the end of the powder cleaning robot, and the process flow of the powder cleaning system includes: storing a powder cleaning program, recognizing a wheel type, entering a powder room and spraying powder, entering a powder cleaning station, calling the powder cleaning program, replacing a gun for the robot, cleaning powder, and completing powder cleaning.

Figure 1:
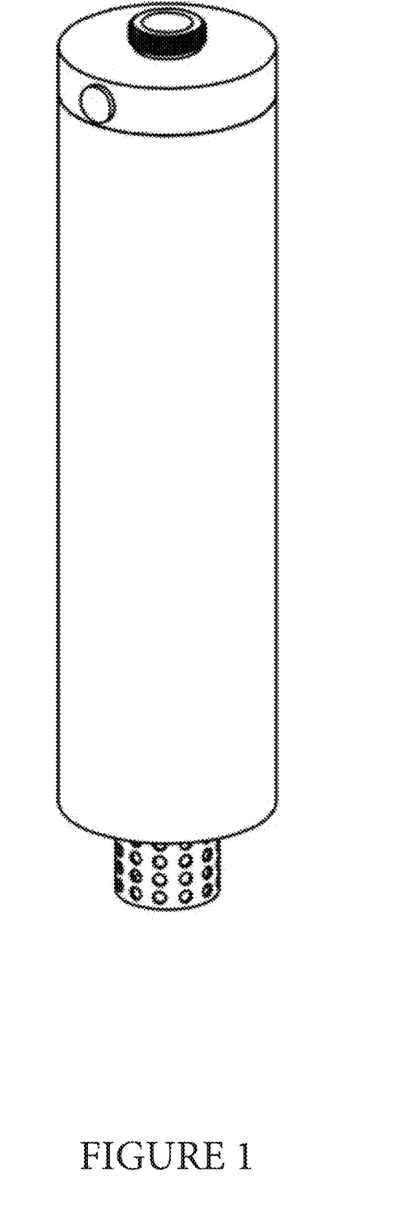
FIG. 1 is a three-dimensional schematic diagram of a combined powder cleaning gun.
Figure 2:
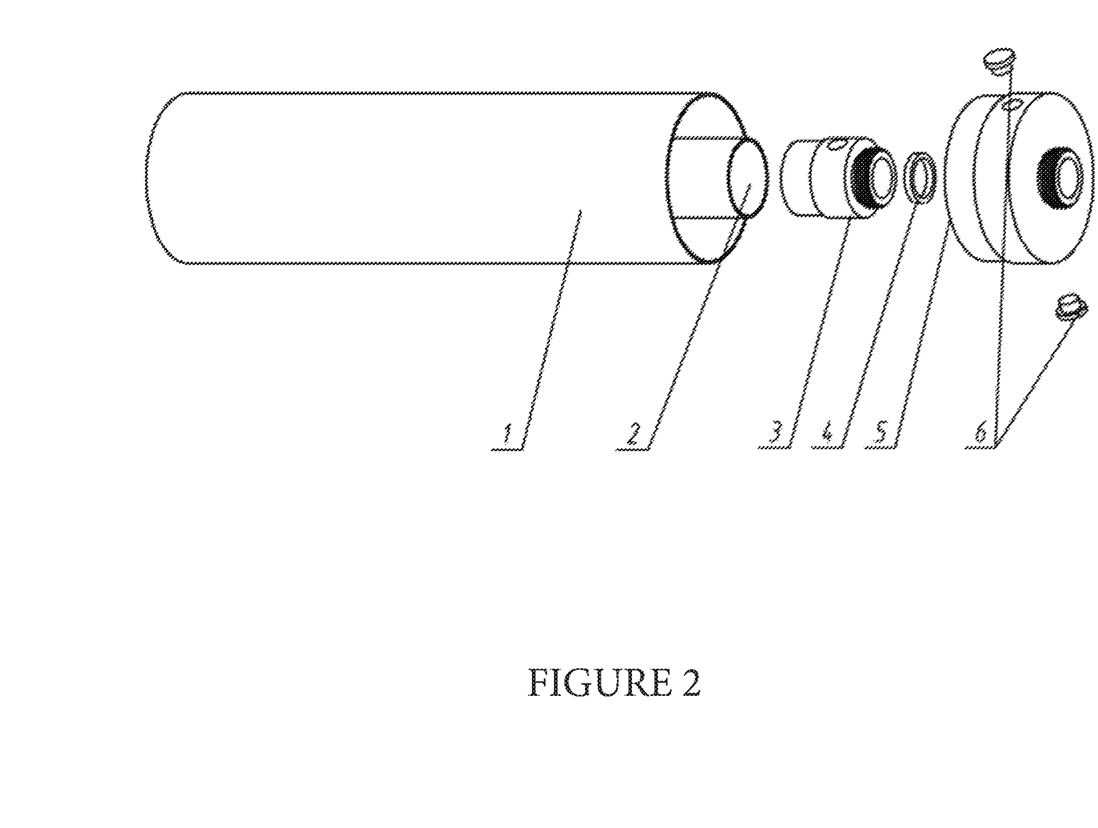
FIG. 2 is a schematic disassembly diagram of the combined powder cleaning gun.
Figure 3:
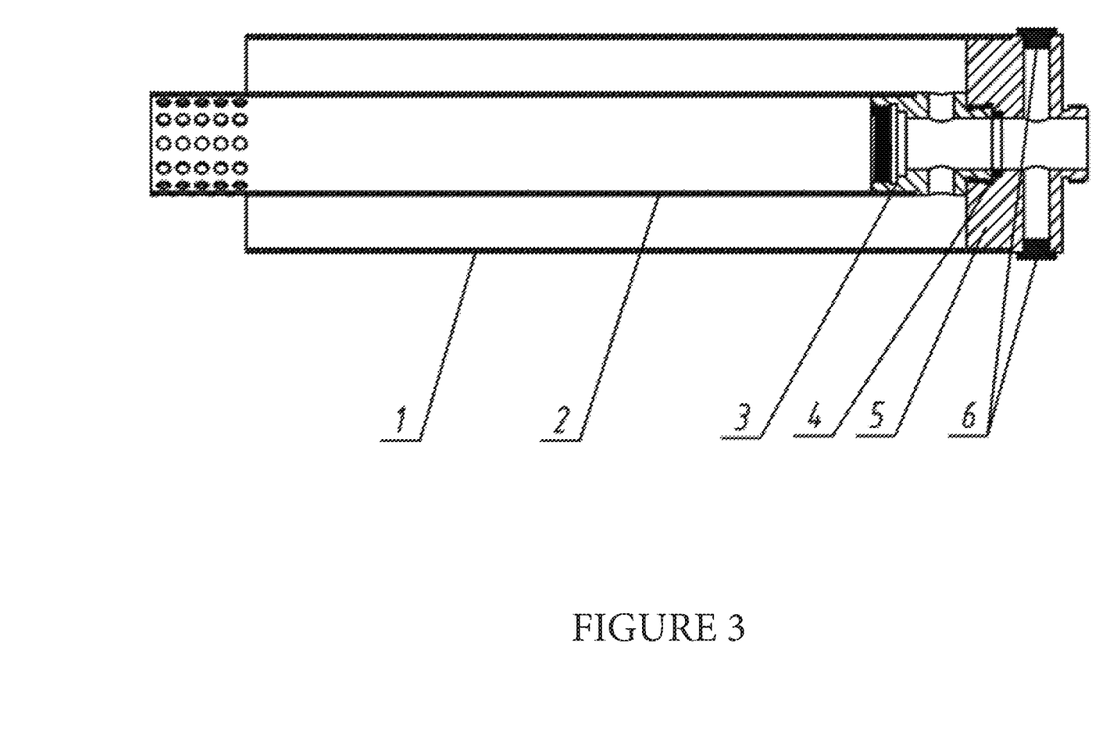
FIG. 3 is a section view of the combined powder cleaning gun.
Figure 4:
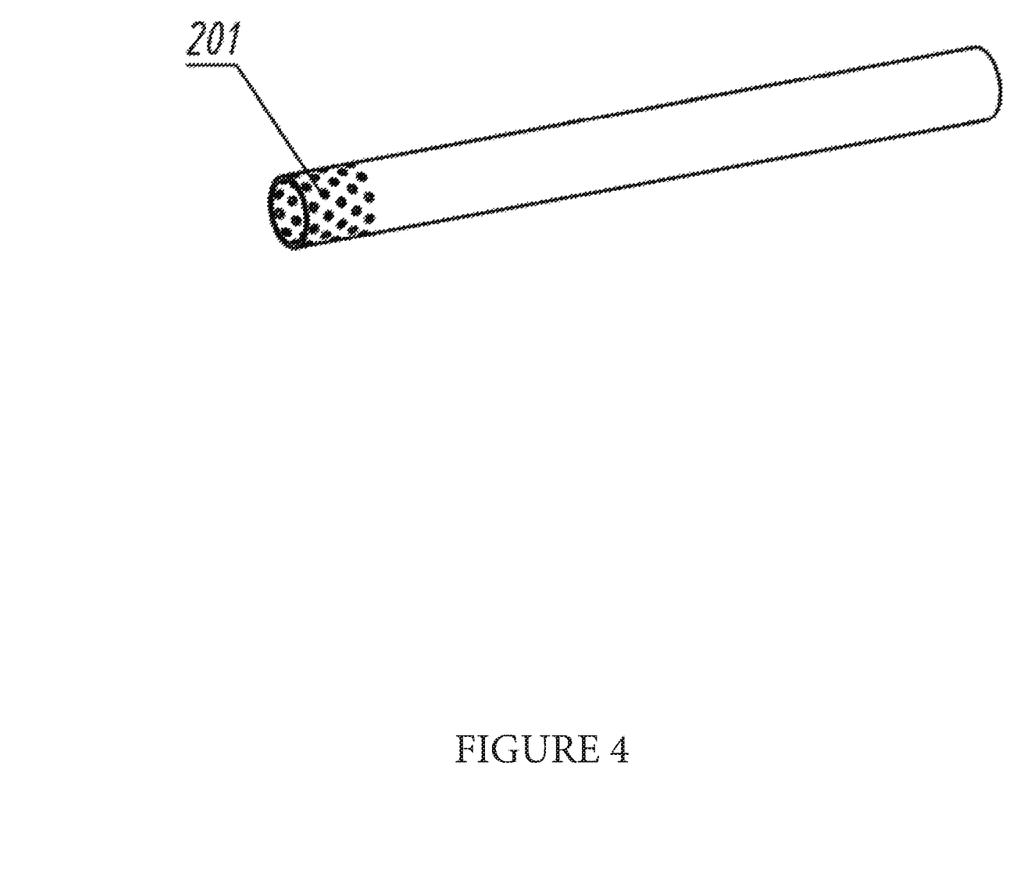
FIG. 4 is a three-dimensional schematic diagram of the central gun barrel.
Figure 5:
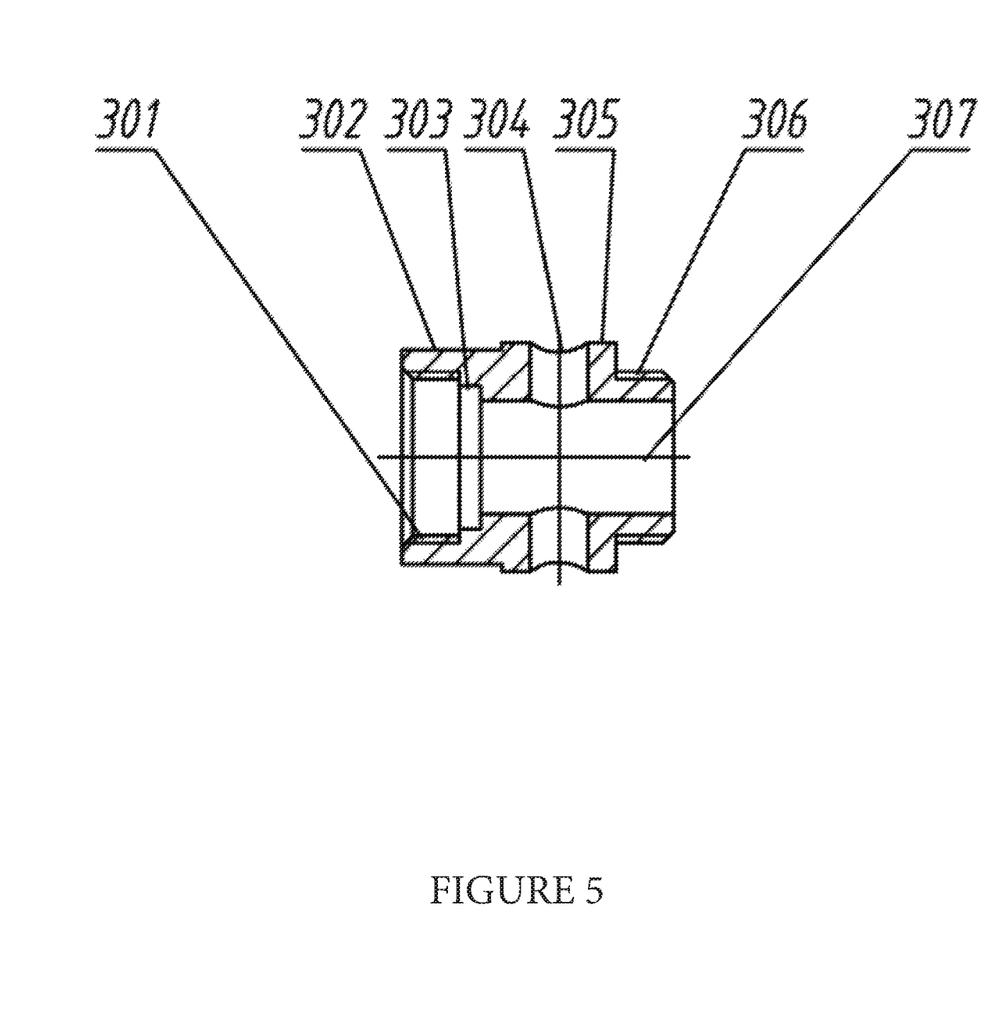
FIG. 5 is a section view of the front combined unit.
Figure 6:
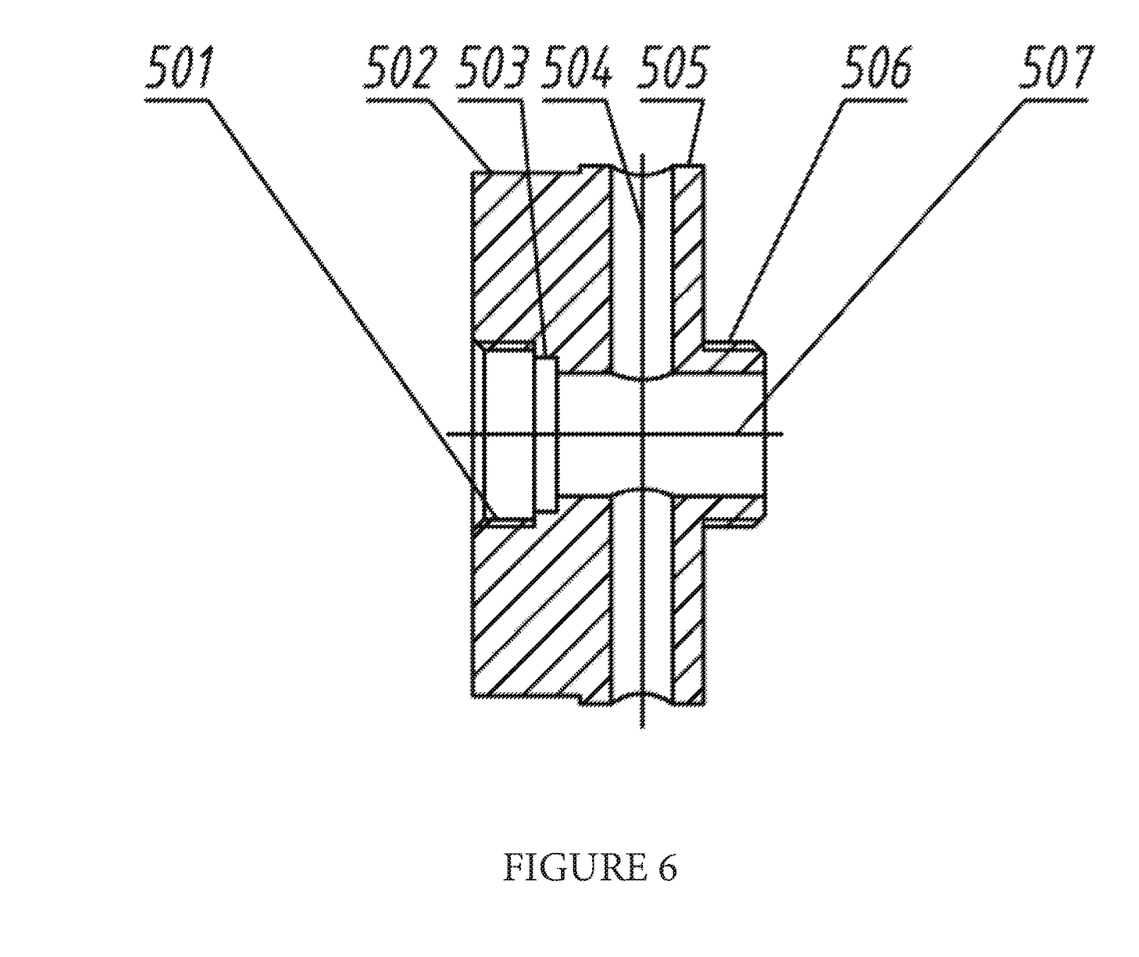
FIG. 6 is a section view of the rear combined unit.

A combined powder cleaning gun for the automatic powder cleaning system for mixed-line hub bolt holes includes, as shown in FIGS. 1-6, includes a combined gun body and a gun barrel. The combined gun body includes a front combined unit 3 and a rear combined unit 5. The lateral surface of the front combined unit 3 includes a front splicing section A 302 and a rear powder absorbing section A 305. The rear combined unit 5 includes a front splicing section B 502 and a rear powder absorbing section B 505. The diameters of the powder absorbing section A 305 and the powder absorbing section B 505 are respectively greater than those of the splicing section A 302 and the splicing section B 502. A powder absorbing through hole A 307 and a powder absorbing through hole B 507 are respectively formed in the centers of the front combined unit 3 and the rear combined unit 5. The powder absorbing section A 305 and the powder absorbing section B 505 are respectively provided with a powder absorbing hole A 304. and a powder absorbing hole B 504. The powder absorbing hole A 304 and the powder absorbing hole B 504 are respectively perpendicular to the axes of the front combined unit 3 and the rear combined unit 5 and are respectively intersected with the powder absorbing through hole A 307 and the powder absorbing through hole B 507. The diameters of the splicing section B 502 and the powder absorbing section B 505 of the rear combined unit 5 are respectively greater than those of the splicing section A 302 and the powder absorbing section A 305 of the front combined unit. An internal threaded hole A 301 and an internal threaded hole B 501 are formed in the front ends of the powder absorbing through hole A 307 and the powder absorbing through hole B 507 of the front combined unit 3 and the rear combined unit 5. An external threaded section A 306 and an external threaded section B 506 are formed at the tail ends of the front combined unit 3 and the rear combined unit 5. The internal threaded hole A 301 can be matched with the external threaded section A 306. The internal threaded hole B 501 can be matched with the external threaded section B 506. The internal threaded hole A 301 and the internal threaded hole B 501 are completely same in size, and the external threaded section A 306 and the external threaded section B 506 are completely same in size. The gun barrel includes a central gun barrel 2 and a ball socket and platform gun barrel 1. The tail of the central gun barrel 2 is connected with the splicing section A 302 of the front combined unit 3. The tail of the ball socket and platform gun barrel 1 is connected with the splicing section B 502 of the rear combined unit 5. The head of the central gun barrel 2 protrudes out of the head of the ball socket and platform gun barrel 1. Dense micro holes 201 are formed in the side wall of the head of the central gun barrel 2. The central gun barrel 2 and the ball socket and platform gun barrel 1 are made of a carbon fiber material. Two small plugs 6 are provided to plug the powder absorbing hole B 504 of the rear combined unit 5, and the small plugs 6 are made of a soft material. A sealing section A 303 and a sealing section B 503 are respectively formed adjacent to the internal threaded hole A 301 and the internal threaded hole B 501, and a sealing ring 4 is installed between the rear end face of the external threaded section A 303 of the front combined unit 3 and the sealing section B 503 of the rear combined unit 5.

The invention claimed is:

1. A combined powder cleaning gun for an automatic powder cleaning system for mixed-line hub bolt holes, comprising a combined gun body and a gun barrel, characterized in that:
   the combined gun body includes front and rear combined units, each combined unit includes a front splicing section and a rear powder absorbing section, the diameter of the powder absorbing section is greater than that of the splicing section for each of the combined units, a powder absorbing through hole is formed in the center of each combined unit, and the powder absorbing section of each combined unit is provided with a powder absorbing hole;
   the diameters of the splicing section and the powder absorbing section of the rear combined unit are respectively greater than those of the splicing section and the powder absorbing section of the front combined unit;
   an internal threaded hole is formed in a front end of the powder absorbing through hole of each combined unit, and an external threaded section is formed at a tail end of each combined unit;
   the gun barrel comprises a central gun barrel and a ball socket and platform gun barrel, a tail of the central gun barrel is connected with the splicing section of the front combined unit, a tail of the ball socket and platform gun barrel is connected with the splicing section of the rear combined unit, a head of the central gun barrel protrudes out of a head of the ball socket and platform gun barrel, dense micro holes are formed in a side wall of the head of the central gun barrel, and two small plugs are provided to plug the powder absorbing hole of the rear combined unit.

2. The combined automatic powder cleaning gun as described in claim 1, characterized in that
the internal threaded hole and the external threaded section of each combined unit adopt mutually matched sizes,
the sizes of the internal threaded hole of the front combined unit and the size of the internal threaded hole of the rear combined unit are completely the same, and
the size of the external threaded section of the front combined unit and the size of the external threaded section of the rear combined unit are completely same.

3. The combined automatic powder cleaning gun as described in claim 1, characterized in that
the powder absorbing hole of the powder absorbing section of the front combined unit is perpendicular to a longitudinal axis of the front combined unit, and is intersected with the powder absorbing through hole of the front combined unit; and
the powder absorbing hole of the powder absorbing section of the rear combined unit is perpendicular to a longitudinal axis of the rear combined unit, and is intersected with the powder absorbing through hole of the rear combined unit.

4. The combined automatic powder cleaning gun as described in claim 1, characterized in that
each combined unit has a sealing section formed adjacent to the internal threaded hole, and
a sealing ring is installed between a rear end face of the external threaded section of the front combined unit and the sealing section of the rear combined unit.

* * * * *